Patented Sept. 18, 1928.

1,684,738

UNITED STATES PATENT OFFICE.

CHARLES HENRI MARSCHALK, OF PARIS, FRANCE.

PROCESS FOR THE MANUFACTURE OF PERYLENE.

No Drawing. Application filed December 1, 1924, Serial No. 753,348, and in France December 20, 1923.

This invention relates to improvements in or modifications of the process for the manufacture of perylene claimed in Patent No. 1,593,982, granted to this applicant July 27, 1926, in which a mixture of betadinaphthol or its phosphoric ester, or its phosphoric esters with a metallic salt and a metallic reducing agent is heated to the distilling point.

This process differs from that described in my aforesaid patent by the employment of the phosphorous esters instead of the phosphoric, and by the absence of an intermediate compound including zinc, and by the omission, in certain examples, of a metallic salt, such as zinc chloride, and a reducing agent, such as metallic zinc.

In Example No. 2 of that patent, the application of such process has been described to the product of the reaction between phosphorus oxychloride with betadinaphthol.

It has been found that by the action of phosphorus chlorides or oxychlorides upon betadinaphthol two types of compound esters of different composition might be formed of which some contain chlorine while others are free therefrom.

It has been found that halogenated phosphoric and phosphorous esters obtained by the prolonged action in the heat of these compounds of phosphorus upon betadinaphthol are particularly well adapted for the manufacture of perylene according to the process described in the prior patent abovementioned.

The tendency of these esters to form perylene is so pronounced that the mere distillation of these products alone gives substantial yields of perylene.

These yields are considerably augmented when the esters in question are distilled with zinc dust alone. The yields are again increased when they are distilled with zinc chloride alone, but the best yields are, however, obtained by the application of the process set forth in Patent No. 1,593,982, i. e. by distillation with a mixture of zinc chloride and zinc dust.

It has been found that the presence of chlorine in the phosphoric and phosphorous esters above mentioned is not absolutely necessary for the formation of the perylene.

By the action of an excess of phosphorus oxychloride upon the betadinaphthol at 200° C. a chlorinated ester having the following constitution is mainly formed:

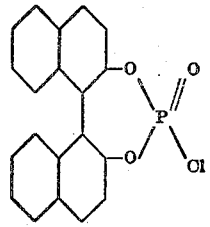

If such ester is treated with alkalies, for example, with a solution of sodium carbonate, it loses its chlorine and yields the well crystallized sodium salt of the acid ester.

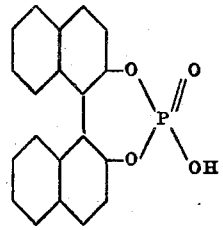

This acid ester behaves just as the chlorinated derivative does, when distilled with or without the addition of the agents above set out. Especially when distilled with zinc chloride and zinc dust, it gives very good yields of perylene.

EXAMPLES.

No. 1.

A mixture of two parts of chlorophosphoric ester of betadinaphthol with one part of zinc dust is distilled in an iron retort.

By crystallizing the product of distillation from toluene pure perylene melting at 265° C. is obtained.

No. 2.

In the same way, the chlorophosphoric ester without any addition is distilled and the product of distillation is treated as in Example No. 1.

No. 3.

A mixture of two parts of chlorophosphoric ester of betadinaphthol with one part of molten zinc chloride is distilled. The perylene is purified as in Example No. 1.

No. 4.

A mixture of two parts of chlorophosphoric ester of betadinaphthol with one part of molten zinc chloride and one half part of zinc is distilled. Very good yields in perylene are obtained.

No. 5.

A mixture of 2.5 parts of phosphorous acid ester of betadinaphthol with two parts of zinc chloride and one part of zinc dust is distilled. The product of distillation is crystallized out of toluene.

No. 6.

3.6 parts of the chlorophosphorous ester of betadinaphthol obtained by the action of an excess of phosphorus trichloride upon betadinaphthol at 200° C. are mixed with two parts of zinc chloride and one part of zinc dust and are distilled as in the preceding examples. Very good yields of perylene are obtained.

No. 7.

When the chlorophosphorous ester of betadinaphthol described in the preceding example is dissolved in carbon tetrachloride and a current of dry chlorine is led into such solution, a white precipitate is obtained; the product thus obtained has the following constitution:

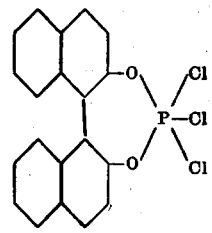

It must therefore be considered as a derivative of phosphorus pentachloride. When this product is distilled with a mixture of zinc chloride and zinc dust perylene is also produced.

The chlorophosphoric and chlorophosphorous esters of betadinaphthol may be prepared in various manners.

Phosphorus halide may be caused to flow slowly into betadinaphthol at temperatures of 100–220° C., or the two reacting bodies may be mixed in the cold and gradually heated under the reflux condenser to 220–250° C.

In all cases, it is well to employ a slight excess of phosphorus halides and to eliminate it by distillation at the finish of the reaction.

What I claim is:

1. The manufacture of perylene by heating to distillation a phosphorous ester containing the beta dinaphthol radicle.

2. The manufacture of perylene by heating to distillation a phosphorous ester containing the beta dinaphthol radicle in the presence of zinc chloride.

3. The manufacture of perylene by heating to distillation a chlorophosphorous ester containing the beta dinaphthol radicle.

4. The manufacture of perylene by heating to distillation a chlorophosphorous ester containing the beta dinaphthol radicle in the presence of zinc chloride.

In testimony whereof I affix my signature.

CHARLES HENRI MARSCHALK.